United States Patent
Nagarajan et al.

(10) Patent No.: US 10,848,435 B2
(45) Date of Patent: Nov. 24, 2020

(54) METHOD AND SYSTEM FOR ADMINISTERING MULTIPLE DOMAIN MANAGEMENT AUTHORITIES ON A MOBILE DEVICE

(71) Applicant: BlackBerry Limited, Waterloo (CA)

(72) Inventors: Sivakumar Nagarajan, Ottawa (CA); Daniel Jonas Major, Ottawa (CA); Kevin Goodman, Nepean (CA)

(73) Assignee: BlackBerry Limited, Waterloo (CA)

( * ) Notice: Subject to any disclaimer, the term of this patent is extended or adjusted under 35 U.S.C. 154(b) by 32 days.

(21) Appl. No.: 14/290,264

(22) Filed: May 29, 2014

(65) Prior Publication Data

US 2015/0350105 A1    Dec. 3, 2015

(51) Int. Cl.
| | | |
|---|---|---|
| *H04L 29/06* | (2006.01) | |
| *G06F 21/00* | (2013.01) | |
| *H04W 12/02* | (2009.01) | |
| *H04W 36/14* | (2009.01) | |
| *H04L 12/927* | (2013.01) | |
| *H04L 12/24* | (2006.01) | |
| *H04L 29/08* | (2006.01) | |
| *H04W 12/08* | (2009.01) | |
| *H04W 12/00* | (2009.01) | |

(52) U.S. Cl.
CPC .......... *H04L 47/80* (2013.01); *H04L 41/5054* (2013.01); *H04L 67/16* (2013.01); *H04W 12/0027* (2019.01); *H04W 12/08* (2013.01); *H04W 12/00502* (2019.01); *H04W 12/00503* (2019.01)

(58) Field of Classification Search
CPC ........ G06F 21/62; G06F 21/10; H04W 12/08; H04W 12/06
See application file for complete search history.

(56) References Cited

U.S. PATENT DOCUMENTS

| | | | | |
|---|---|---|---|---|
| 6,466,932 | B1* | 10/2002 | Dennis ................. G06F 21/10 707/694 |
| 8,949,201 | B1* | 2/2015 | Batchu .............. G06F 17/30303 707/692 |
| 9,143,932 | B1* | 9/2015 | Feldman ............... H04W 12/02 |
| 9,183,380 | B2* | 11/2015 | Qureshi .................. G06F 21/53 |
| 2003/0179703 | A1* | 9/2003 | Levy ...................... H04L 41/06 370/230 |
| 2005/0260973 | A1* | 11/2005 | van de Groenendaal ................... H04L 63/102 455/411 |
| 2006/0047957 | A1* | 3/2006 | Helms .................... G06F 21/10 713/165 |
| 2006/0143622 | A1* | 6/2006 | Prabandham ........... G06F 9/445 719/328 |

(Continued)

OTHER PUBLICATIONS

European Patent Office, Extended European Search Report on Application No. 15169699.4, dated Nov. 3, 2015.

*Primary Examiner* — Hee Soo Kim
*Assistant Examiner* — Ho T Shiu
(74) *Attorney, Agent, or Firm* — Moffat & Co

(57) ABSTRACT

A method for administering multiple management agents on a mobile device, the method receiving, at a policy manager on the mobile device, a policy from each of the multiple management agents; determining a current state of the mobile device; and consolidating the policies based on rules within the policy manager and the current state of the mobile device.

20 Claims, 10 Drawing Sheets

(56) References Cited

U.S. PATENT DOCUMENTS

| | | | |
|---|---|---|---|
| 2007/0281682 A1* | 12/2007 | Raju | H04L 67/2823 455/422.1 |
| 2008/0051076 A1* | 2/2008 | O'Shaughnessy | G06F 21/305 455/419 |
| 2010/0154025 A1* | 6/2010 | Esteve Balducci | H04L 63/20 726/1 |
| 2012/0042395 A1* | 2/2012 | Jain | G06F 21/6218 726/30 |
| 2013/0078949 A1* | 3/2013 | Pecen | H04L 63/101 455/411 |
| 2013/0122910 A1* | 5/2013 | Singh | H04W 36/14 455/437 |
| 2013/0227637 A1 | 8/2013 | Nagarajan et al. | |
| 2013/0262392 A1* | 10/2013 | Vibhor | G06F 17/30082 707/654 |
| 2013/0268656 A1* | 10/2013 | Bott | H04W 4/16 709/224 |
| 2014/0007222 A1* | 1/2014 | Qureshi | G06F 21/10 726/16 |
| 2014/0115693 A1 | 4/2014 | Schieman et al. | |
| 2014/0188804 A1* | 7/2014 | Gokhale | G06F 21/6218 707/645 |
| 2014/0380425 A1* | 12/2014 | Lockett | H04L 63/20 726/4 |

* cited by examiner

METHOD AND SYSTEM FOR ADMINISTERING MULTIPLE DOMAIN MANAGEMENT AUTHORITIES ON A MOBILE DEVICE

FIELD OF THE DISCLOSURE

The present disclosure relates to management authorities on a mobile device and in particular relates to a mobile device having a plurality of management authorities.

BACKGROUND

Mobile devices are often deployed into regulated environments, where devices need to be managed or controlled. For example, such management may restrict access to data on the device to a particular set of applications, restrict functionality of services on the device, restrict access to external sources from the device, among other options.

Sometimes management agents may manage the entire device and sometimes the agents may only manage a portion of the device. Also, the management agents on the device may come from various sources, including, for example, device vendors or manufacturers, or from third party sources to provide agents on the device to manage specific functionality of the device.

If multiple management authorities exist on the device, currently a remote management endpoint may be utilized to control the functionality within a controlled group or provide very limited control of the entire device. While this allows control of the device, such deployment is highly customized and unique based on the device and the remote endpoint pair.

BRIEF DESCRIPTION OF THE DRAWINGS

The present disclosure will be better understood with reference to the drawings, in which.

DETAILED DESCRIPTION OF THE DRAWINGS

Figure 1:
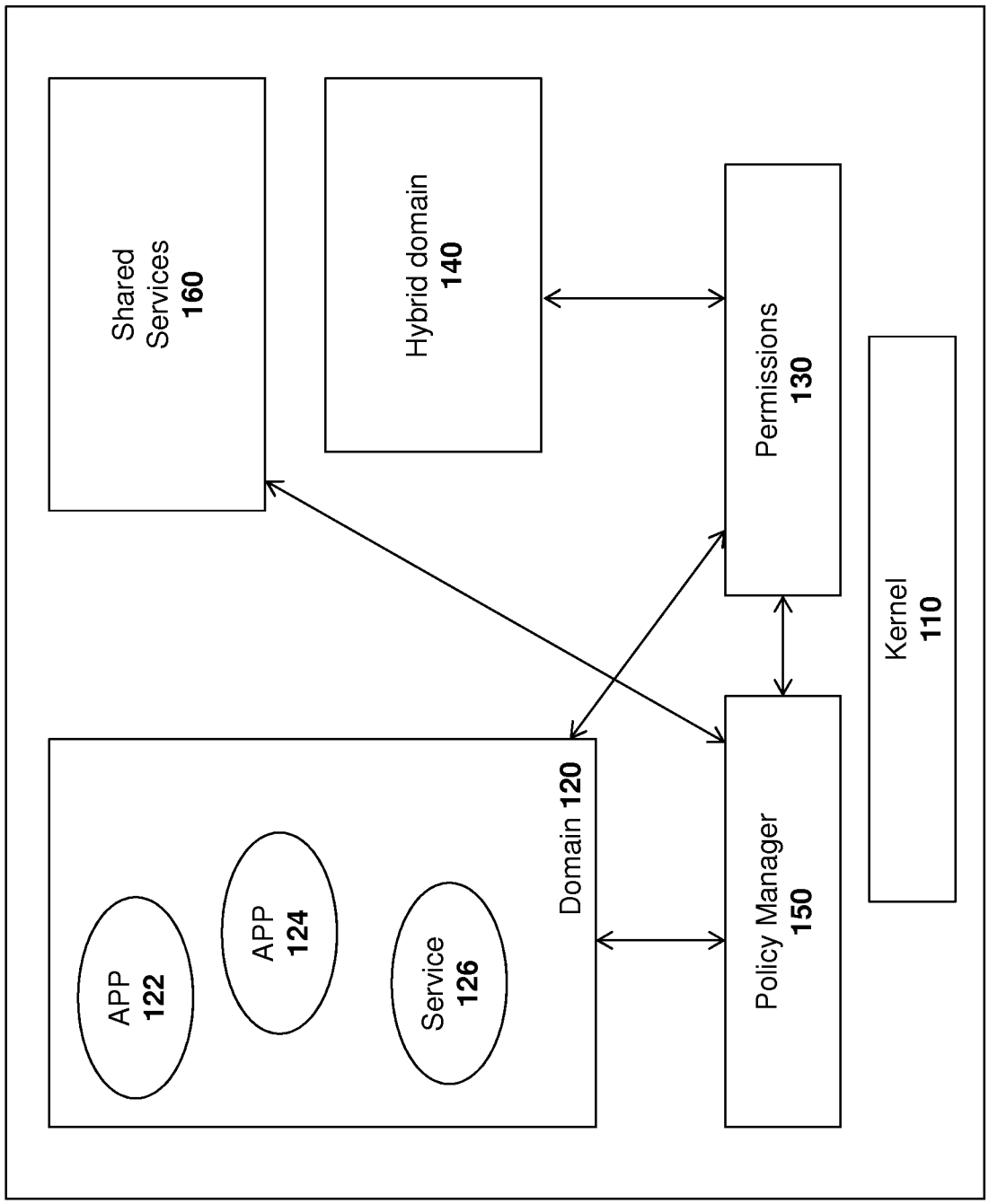
FIG. 1 is a block diagram illustrating logical components on a mobile device for administering multiple management agents.

The present disclosure provides a method for administering multiple management agents on a mobile device comprising: receiving, at a policy manager on the mobile device, a policy from each of the multiple management agents; determining a current state of the mobile device; and consolidating the policies based on rules within the policy manager and the current state of the mobile device.

The present disclosure further provides a mobile device having a plurality of concurrently operative operating systems, the mobile device comprising: a processor; and memory, wherein the mobile device is configured to: receive, at a policy manager on the mobile device, a policy from each of the multiple management agents; determine a current state of the mobile device; and consolidate the policies based on rules within the policy manager and the current state of the mobile device.

Various device management agents may be provided on a device. A management agent, as used herein, is an entity on a device which may receive and enforce policy decisions, for example from an external management authority. The management agent is one endpoint of the management authority and may act as a proxy for the management authority on the device. For example, an enterprise may wish to enforce a corporate policy on devices of employees. As such, the enterprise may have a server acting as a management authority that allows administrators to set and push policies to devices. The devices have a management agent to receive and implement such policies. In some cases, the user of a mobile device may also be considered to be a management authority.

Management agents may be from device vendors and added at the time the device is built, or may be deployed or provisioned subsequently. Additionally, often third party agents may wish to run on the device to manage specific functionality of the device. Also, depending on factors including the ownership of the device, provisioning, data present on the device, purpose of the device, among other factors, each of these management authorities may want to control various aspects of the functionality of a device. Typically, a device may allow very limited management to a small subset of functionality for third party agents and/or allow only one management agent to exist on the device.

In some implementations, a single user device may include multiple domains or perimeters that logically separate computer resources (e.g., applications, data, network access, configuration files) such that a domain may be prevented from accessing resources included in a different domain. For example, the domains may prevent personal resources in one domain may be prevented from accessing corporate resources in another domain or vice-versa. Keeping corporate data, applications, and networks isolated from personal data, applications, and networks is desirable because a user can use a single device to separately access the different groups of resources. In other words, an enterprise may extend a secured domain on a single user device without interfering with the user's personal experience on the same device. In some embodiments, the device may also comprise a hybrid domain that allows access to data in the other domains as needed. This hybrid domain may, for example, be used to show unified inbox applications that shows e-mail messages from all of the domains. In other embodiments, different types and numbers of domains could be included on the device.

Further, a device may have multiple functional groups of domains on the device. For example, a device may have a personal domain and a work domain, a parent domain and a child domain, a personal domain as well as a domain for various consultants, among other options. In such an environment, management authorities may wish to contain various functionality within the group and also restrict the access to each group. As used herein, a domain may be a separate area in the software on a mobile device, and in some cases may be an area running its own virtualized operating system on the mobile device hardware.

Where multiple domains are employed, in addition to providing a separate memory area on the device (i.e, a container), there may be also a desire to deploy management agents that operate within each domain. Such management agents may have an ability to extend restrictive controls to both within the domain they are associated with, as well as provide some controls outside such domain. For example, if a device has a personal domain and a corporate domain, the corporate domain may have a management agent that wishes to restrict use of external storage such as an SD card to prevent corporate data from being easily removed from the device. The management agent for the corporate domain may thus need to extend policies beyond the corporate domain to the entire device by restricting the device from being able to add and use an external SD card.

In order to have multiple management authorities on the device that control both the functionality within a particular domain and also device functionality for the device as a whole or at least a portion of the device outside of the particular domain, the present disclosure provides for a policy manager which may administer each of the management agents and aggregate the restrictive sets of functionality from each of these management agents. As used herein, a policy manager is a logical entity on a mobile device capable of receiving policies and restriction sets from one or more management agents on the device, and consolidating the policies and restriction sets and resolving conflicts regarding such policies on the device.

Reference is now made to FIG. 1. As seen in FIG. 1, a device may include various logical components as part of the operation of such device. In particular, a device may have an operating system which includes a kernel 110 on which the software of the device runs.

In the example of FIG. 1, a single domain 120 exists on the device. However, this is merely meant for illustrative purposes and in accordance with the present disclosure multiple domains could exist on a device. Domain 120 includes various applications and services. In particular, in the embodiment of FIG. 1, application 122 and application 124 are provided within the domain 120. Further, services, which may provide functionality for applications and run in the background, are included within domain 120 and are shown as services 126. For example, one service may include a contacts service with may provide data to applications that need to display contact information.

A permissions engine 130 is used to control device permissions and allow certain functionality and operation of the device. For example, device permissions may allow access to certain hardware or software on the device, may require certain preconditions such as a password being entered prior to allowing access to data, among other options.

As seen in the embodiment of FIG. 1, domain 120 interacts with permissions engine 130 to determine what functions applications 122 or 124, or services 126 may complete, and determine if such applications or services are allowed to perform the operations that they are attempting.

Further, in the embodiment of FIG. 1, a hybrid domain 140 exists. Hybrid domain 140 is a special domain which may have access to the plurality of domains that are on the device. In the example of FIG. 1, since only domain 120 exists on the device, hybrid domain may have access to the data within the domain to provide for various functionalities such as a consolidated e-mail application, among other options.

In accordance with the present disclosure, a policy manager 150 is added to a device to administer multiple management authorities (agents). Policy manager 150 provides a mechanism for regulating a hierarchy of management authorities. The entries in the hierarchy of authorities may be ranked, for example, in order of the trust associated with a vendor providing the software for the management authorities when viewed by the policy manager 150. Management authorities, sometimes referred to herein as mobile device management (MDM) agents, can be provided by various sources, including the device vendor as part of trusted software on the device, or may be delivered to the device as part of the process referred to as activation.

Shared services 160 may include any services that may be used by multiple domains. For example, a Wi-Fi chip may exist on the mobile device, where a plurality of domains may require access to the Wi-Fi chip. A policy may be to turn off Wi-Fi or to turn on Wi-Fi. Control of the shared services is directed by the policy manager 150 when it aggregates the policies of each of the MDM agents in each of the domains.

In accordance with the embodiments herein, the MDM agent should be allowed to exercise full controls of the domain that it is deployed into and in some cases extend control, such as restrictive control, outside the domains if other existing management agents on the device allow such controls. In some cases an MDM agent may wish to exercise full control over more than one domain. When multiple agents are controlling a single domain, a hierarchy of these MDM agents and their control mechanisms is established based on various factors, and this hierarchy governs how conflicts among policies from different MDM agents are resolved.

Multiple agents may co-exist on the device at the same time and an MDM agent is provided with elevated privileges within the domain they are controlling and limited privileges outside the domain area they are controlling, as determined by policy manager 150.

The policy manager 150 may organize the management authorities into a hierarchy of controlling entities. In this way, the device can be controlled to operate in the most restrictive of all of the controlling rules deployed to the device. Such restrictions can include user preferences or parental controls, which provide the means of additional management authorities on the device.

As the mobile device transitions during its routine activities, the policies on the device are aggregated across all management authorities and all domains, such that the device always operates in an appropriate way. As the device transitions into less or more restrictive environments or configurations, or as domain authorities are added or removed from the device, the appropriate controls on the device are automatically adjusted by policy manager 150.

Figure 2:
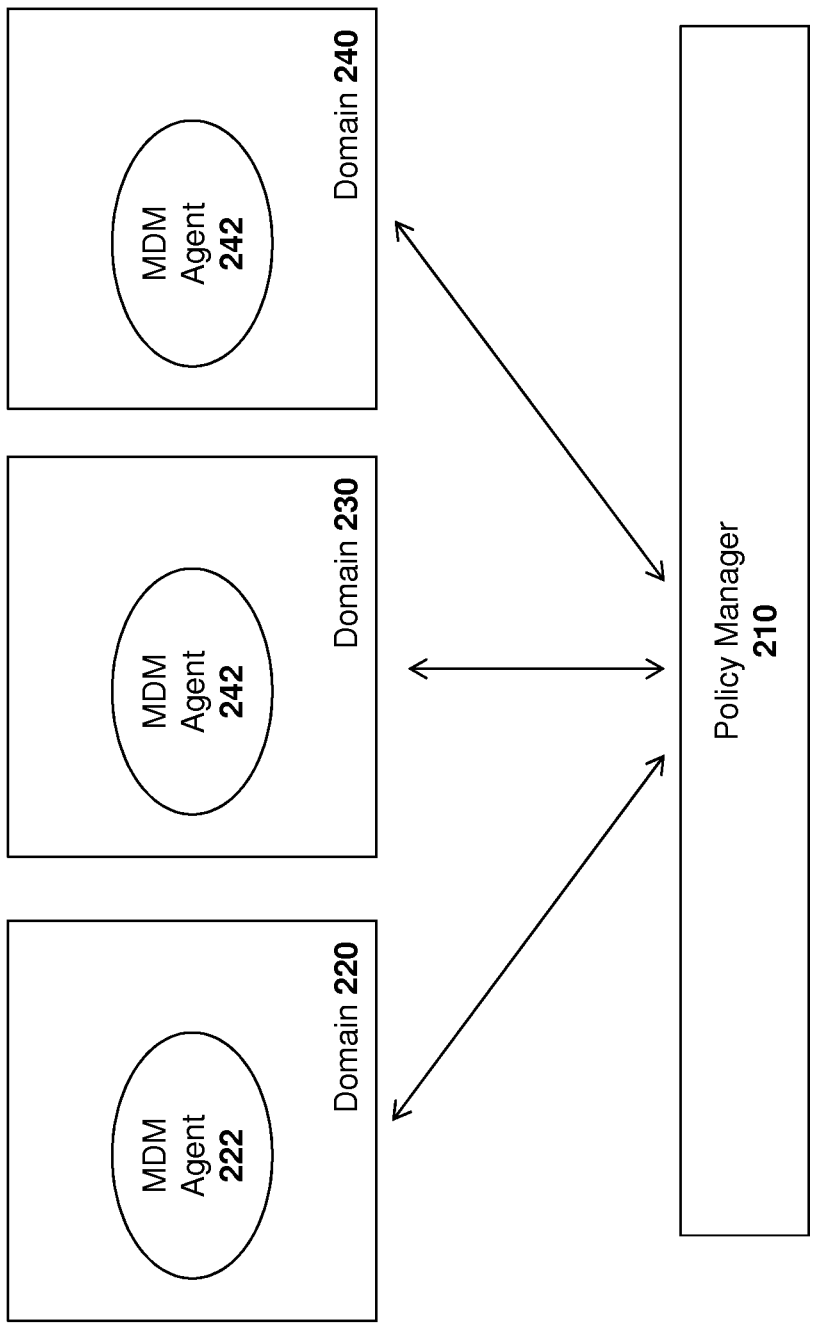
FIG. 2 is a block diagram showing a policy manager administering three domains, each with its own management agent.

Reference is now made to FIG. 2. As seen in FIG. 2, one exemplary environment is provided in which a plurality of domains interact with the policy manager, where each of the domains has its own MDM agent. In particular, policy manager 210 communicates with a first domain 220, a second domain 230 and a third domain 240. Domain 220 includes MDM agent 222, domain 230 includes MDM agent 232 and domain 240 includes MDM agent 242.

In this environment, MDM agents 222, 232 and 242 may have policies with regard to the data and applications within each of their respective domains, but may also have policies that extend beyond the domains to either a restrict a portion of or the entire device outside of their domain. The job of policy manager 210 is to aggregate and administer these demands for the resources for the entire device.

Figure 3:
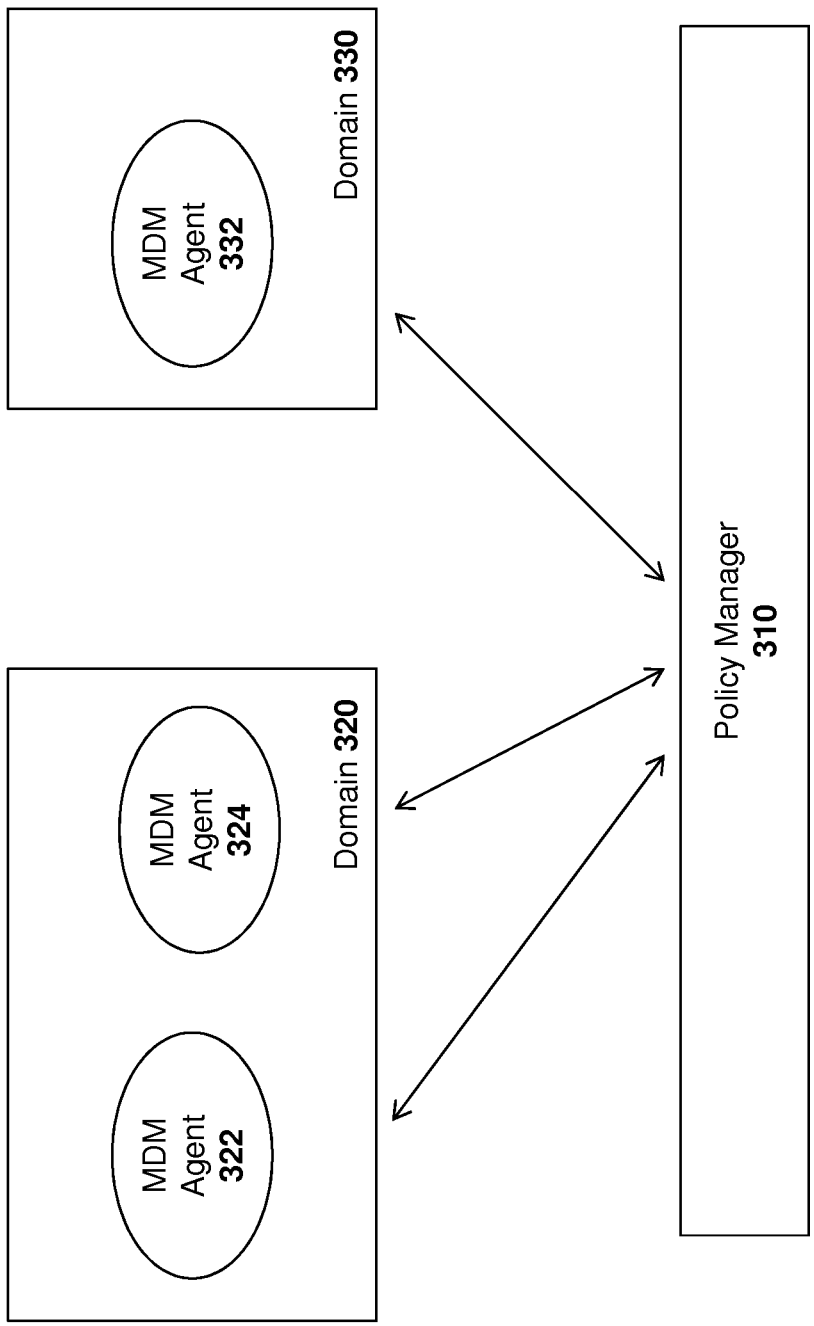
FIG. 3 is a block diagram showing a policy manager administering two domains, a first having two management agents, and a second having one management agent.

In a further embodiment, as shown with regards to FIG. 3, policy manager 310 interacts with domains 320 and 330. Domain 320 includes two MDM agents, namely MDM agent 322 and MDM agent 324. For example, this may occur if both an enterprise and the user add management agents to a particular domain. However, other examples are possible.

Domain 330 includes MDM agent 332.

Again, the job of policy manager 310 is to aggregate the management policies of each of the MDMs and to manage the permissions and shared services on a device.

Figure 4:
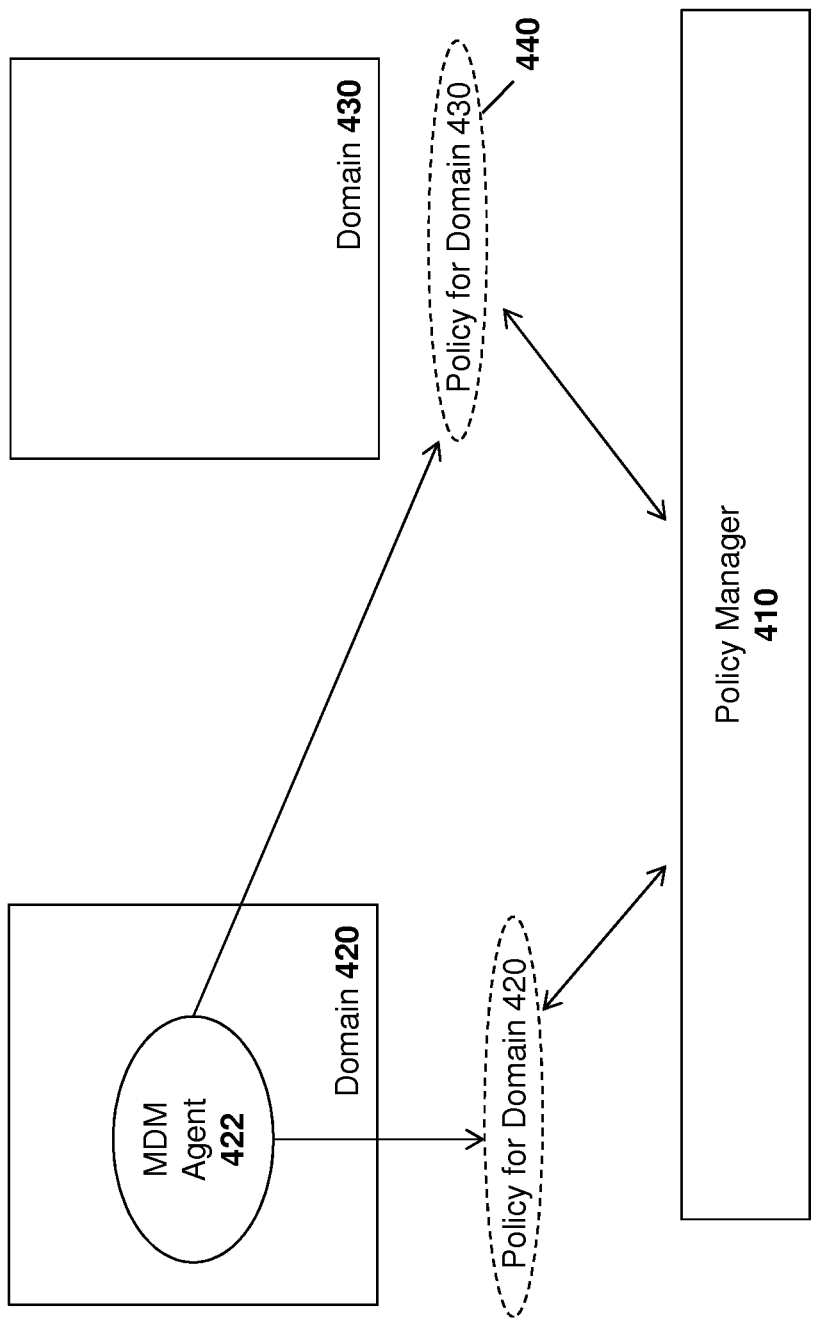
FIG. 4 is a block diagram showing a policy manager administering two domains, a first having a management agent, and a second having none.

Referring to FIG. 4, a further embodiment is shown in which a policy manager 410 manages the policies on the device. In this case, a first domain 420 and a second domain 430 exist on the device. For example, domain 420 may be a corporate domain and domain 430 may be a personal domain.

In the example of FIG. 4, domain 420 includes an MDM agent 422, whereas domain 430 does not include an explicit management agent for that domain.

However, MDM agent 422 may have policies that are applicable not only to domain 420, but also may have policies that are applicable to other domains, or to the entire device or a subset of device functionality.

As illustrated in FIG. 4, MDM 422 includes logical policies that may apply to domain 430, shown with block 440 in the example of FIG. 4. The policies for domain 430 that are found in MDM 422 may extend across the domain boundaries and policy block 440 is a logical domain extending such policies. For example, if domain 420 is a corporate domain, the corporate domain may indicate that no SD card is allowed on a device in general. Since this policy extends across the domains, such policy may be implemented as a logical block 440 so that domain 430 is not also allowed to have SD cards as long as domain 420 is present.

Figure 5:
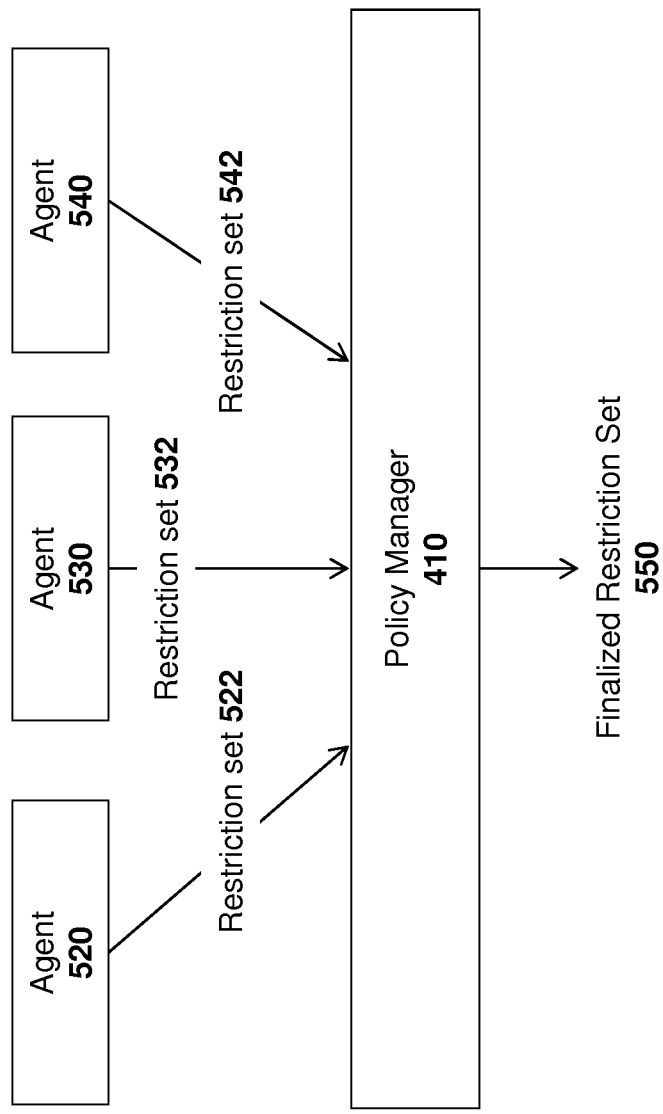
FIG. 5 is a block diagram showing a policy manager aggregating restriction sets from a plurality of agents.

Reference is now made to FIG. 5, which shows a logical block diagram in which various agents reside on a device. In some embodiments, each domain may have no agent or an individual agent, and in other embodiments multiple agents may exist within one domain. However, all of the agents interact with a policy manager. Thus, as seen in FIG. 5, policy manager 510 interacts with agents 520, 530 and 540.

Agent 520 includes a restriction set 522. Restriction set 522 indicates the restrictions on the device that agent 520 imposes. Thus, for example, the restriction set may indicate that a camera is not allowed, that printing or e-mailing certain information is not allowed when the domain that agent 520 is in is active, that communication must be over a cellular and Wi-Fi must be off, among other restrictions. Similarly, agent 530 includes a restriction set 532 and agent 540 includes a restriction set 542.

Policy manager 510 communicates with each of the agents and receives the restriction set from each of the agents. One job of policy manager 510 is then to generate an aggregation of the various restriction sets from the various agents to produce a finalized restriction set 550. The finalized restriction set will indicate how the device operates at a particular time. The finalized restriction set may also limit the range of controllable options on the device. Thus, for example, if the resultant restriction set requires that the maximum value for time before an idle device transitions to a lock state is 2 minutes, the user may be allowed to reduce this value optionally to any value less than that, but never to a value greater than that.

In accordance with the present disclosure, the finalized restriction set 550 may be dynamic and change based on environmental conditions of the device. For example, if the device is moving into a particular geographic location, then certain restrictions may be lifted. In other cases, when a particular domain becomes active then certain restrictions may become active while other restrictions may be lifted. In all cases, the finalized restriction set is the restriction set that is currently deployed on a device and can be used by policy manager 510 when communicating with the shared services or permissions blocks from FIG. 1.

Figure 6:
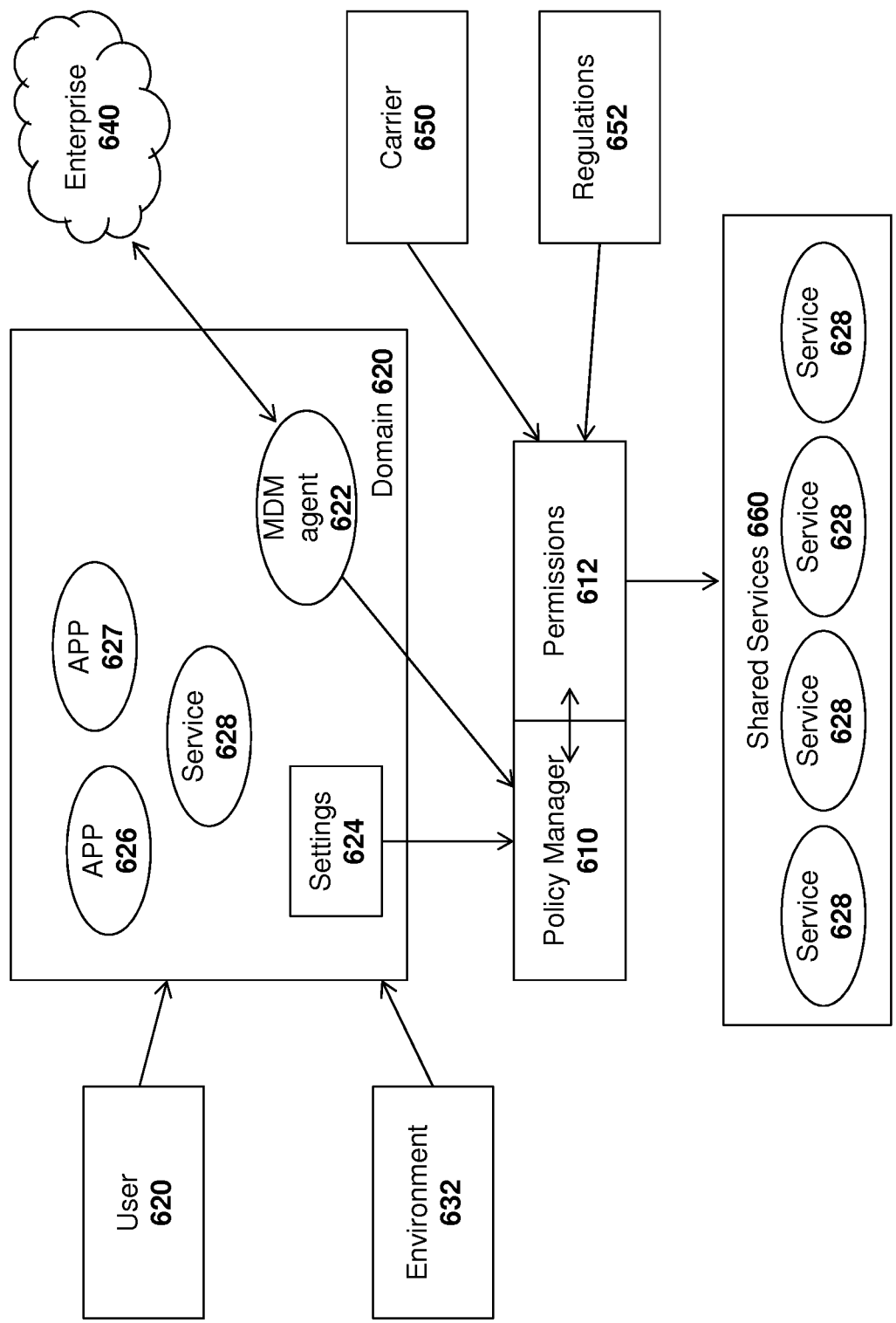
FIG. 6 is a block diagram showing various elements which may affect policies and services on a device.

Reference is now made to FIG. 6, which shows a block diagram of a generalized environment for the policy manager, including the inputs that can cause changes in policies and restriction sets. The embodiment of FIG. 6 is a generalization with a single domain. However, the example of FIG. 6 could easily be expanded to have a plurality of domains in accordance with the embodiments of the present disclosure.

Policy manager 610 receives inputs from various sources including a permissions block 612 and a domain 620. In particular, domain 620 has MDM agent 622 which provides for policies and restriction sets to policy manager 610. Further, domain 620 includes a settings block 624 which may provide for policies based on the settings made by, for example, a user 630 through configuration options on a device. Domain 620 further includes applications such applications 626 and 627 as well as services such as services 628 from the embodiment of FIG. 6.

The environment that the device operates under or transitions into 632 may also provide triggers that can enable or disable previously configured restriction sets. For example, if the mobile device enters a certain cell or moves within a certain geographic region such as a corporate campus, then restrictions and policies may be imposed on the device.

As seen in FIG. 6, the MDM agent 622 may receive input and provide information to an enterprise 640. For example, the enterprise 640 may be the entity which deployed the MDM agent and may push policies to the MDM agent 622. In other embodiments, rather than an enterprise 640, other external management entities could equally be used to communicate and push policies to an MDM 622.

The permissions block 612 further may receive input based on a carrier 650 or regulations 652. Carrier 650 may, for example, be a device's home carrier and provide a set of operating rules for devices that are attached to that carrier.

Further, regulations 652 may be local regulations for the geographic region in which the device is currently operating. These may be regulatory requirements such as the use of a camera, whether or not a camera needs to make a shutter sound, emergency operator services required on the device, among other factors. Such regulations may change as the mobile device roams in to various networks and can affect the permissions block 612.

Based on all of the inputs, policy manager 610, through permission block 612, may regulate the use of its shared services 660. As seen, shared services 660 include various services 662, 664, 666 and 668 in the example of FIG. 6. Such services may include, for example, the cellular radio, Wi-Fi, camera, memory slots, among other shared services.

As will be appreciated by those in the art, the various policies and restrictions from each of the agents may be cumulative. For example, restrictions tend to turn off services or features on a device rather than add to them. Thus, if new features or services are restricted then the list of restricted services may grow.

However, in some cases policy manager 610 will need to resolve conflicts between the various agents. This may be done, for example, by providing a ranking of the various agents based on the trust that the policy manager places with each of the agents and the higher priority agents may be provided with greater deference in the case of conflict situations. In the absence of a ranking of trust between controlling MDM agents, an implicit hierarchy is assumed based on the order in which the MDM agents establish control on a domain. As MDM agents may deploy restrictions to a domain progressively over time, an agent that already controls a domain can choose to prevent subsequent agents from providing subsequent controls on that domain. An agent that wishes to control a domain can choose to either operate under such restrictive conditions or prevent the use the that device under the management control of that given MDM.

Figure 7:
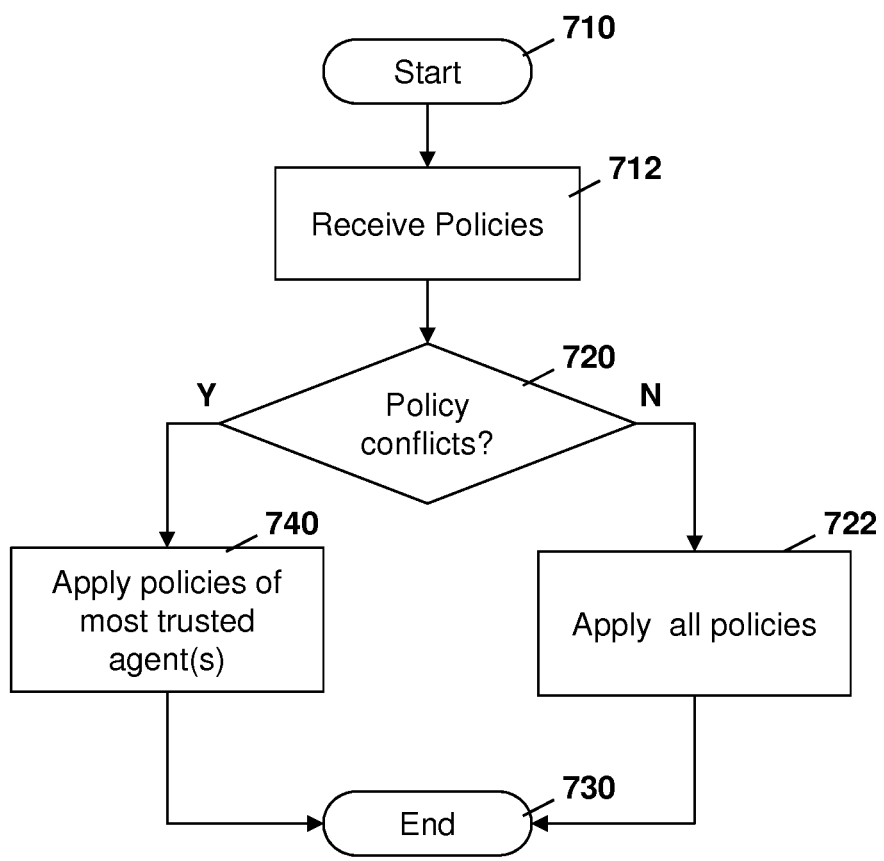
FIG. 7 is a flow chart showing the choice of policies in potential conflict situations.

Reference is now made to FIG. 7, which shows a process of determining which policies to apply at a policy manager. The process starts at block 710 and proceeds to block 712 in which the policy manager receives the policies from all the agents and settings on the device.

The policy manager then consolidates all of the policies and checks to determine whether there is a conflict, as seen at block 720. If no, then the process proceeds to block 722 in which all of the policies are applied and aggregated on the device and the policy manager can then push such policies to the permissions block as well to the shared services blocks of the device to ensure that the current set of policies are applied for the device. The process then proceeds to block 730 and ends.

Conversely, if there is a conflict between various policies then the process proceeds to block 740 in which the policy manager applies a set of policies for the most trusted of the management agents. This may, for example, be done by removing the policies of the least trusted agent and determining whether a conflict still exists and continuing in this way until there is no conflict for the remaining subset of policies. At this point, the remaining policies may be applied for the device and the process proceeds to block 730 and ends.

Figure 8:
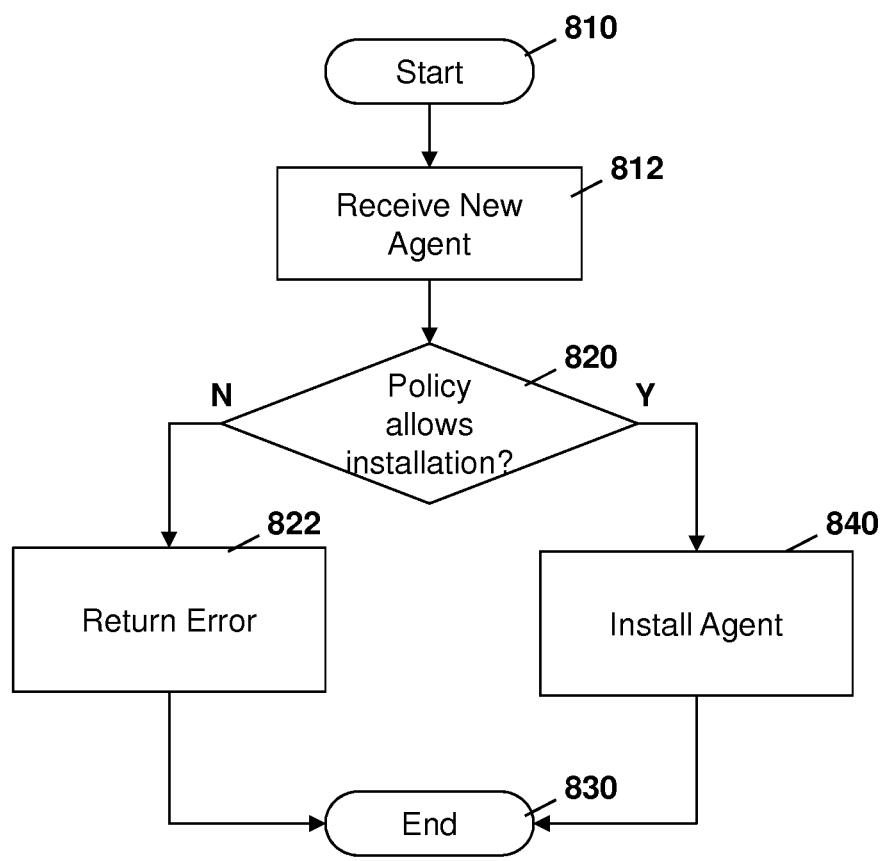
FIG. 8 is a flow chart showing a process for installing an agent.

A new management agent may need to be installed on a device at some point. Reference is now made to FIG. 8, which shows a process at a policy manager for adding a new management agent. In particular, the process starts at block 810 and proceeds to block 812 in which a device receives a new management agent for the device.

The process then proceeds to block 820 in which a check is made to determine whether there is any current policy on the device against installing the management agent. For example, in some cases policies may regulate that no new management agents be added or that certain preconditions exist before a management agent is able to be installed. If, at block 820, the policy is not allowed then the process proceeds to block 822 in which an error message is returned and the process proceeds to block 830 and ends.

Conversely, if the policy is allowed then the process proceeds to block 840 in which the policy may be installed. The process then proceeds to block 830 and ends.

The policy manager may further need to change the policies that are applied on a device based on the inputs as, for example, seen in FIG. 6 above. Thus, if the mobile device moves into a new environment, has a new regulatory framework that it needs to comply with, a certain domain is started or quit, among other factors, then the policy manager may need to change the policies that are applied to the device.

Figure 9:
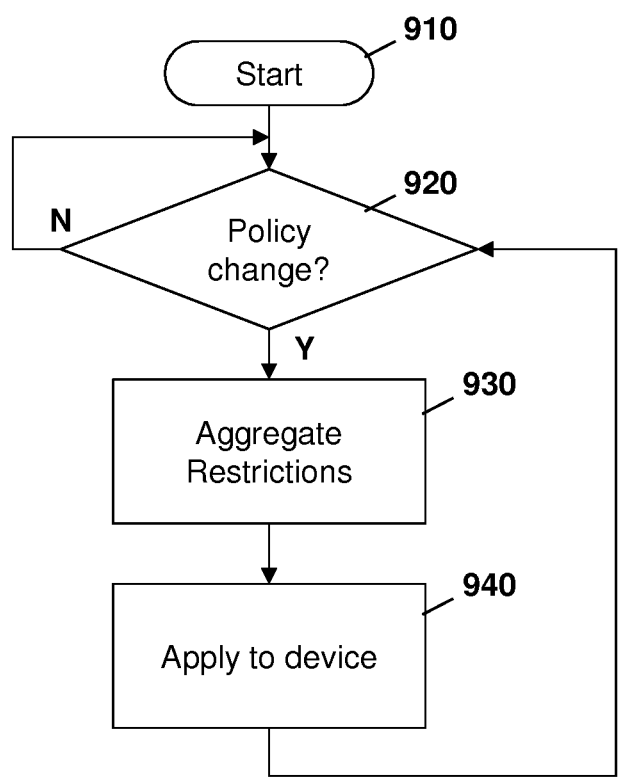
FIG. 9 is a flow chart showing a process for changing a policy on a device.

Reference is now made to FIG. 9 which shows a process at a policy manager and begins at block 910. The process then proceeds to block 920 in which a check is made to determine whether there are any policy or restriction changes. As indicated above, such changes may be based on a change in the device and the policy manager may set triggers within other parts of the device to determine when such changes occur. In other embodiments, the policy manager will be told by the operating system when certain processes start or stop. The policy manager may also poll certain processes or logical blocks to determine whether there is a policy change required.

If no policy change is required, the process continues to loop to block 920 to wait for a policy change.

Once the policy change is detected then the process proceeds to block 930 in which the new policy and restrictions are aggregated. The aggregated restrictions at block 930 may result in more or less restrictions than previously found, depending on the type of policy change that occurred at block 920.

From block 930 the process proceeds to block 940 in which the new policies and restrictions are applied to the device. For example, such application may be in accordance with FIG. 7 above. From block 940 the process proceeds back to block 920 to wait for further policy changes.

The interaction between the policy manager and the management agents to supply the policies and restriction sets may be done in a number of ways. For example, the management agents on the device may need to use a standard application program interface for the policy manager and provide information in a predefined format.

Alternatively, an abstraction layer could exist between the various management agents and the policy manager to translate the information from the management agents into a format expected by the policy manager. Such abstraction layer could be provided based on the type of device and policy manager and could be customized for various third party management agents.

The policy manager could then use rules within the manager to manage the plurality of policies and restriction sets from the various management agents.

The processes of any of FIGS. 1 to 9 may be stored as program code in any tangible, non-transitory computer readable medium, which when accessed by a processor on the mobile device may cause the processes to be executed.

As will be appreciated by those in the art, the above may be implemented on any computing device. If the above is implemented on a mobile device, one example mobile device is provided with regard to FIG. 10.

Mobile device 1000 may be a two-way wireless communication device having voice and data communication capabilities. Depending on the exact functionality provided, the mobile device may be referred to as a data messaging device, a two-way pager, a wireless e-mail device, a cellular telephone with data messaging capabilities, a wireless Internet appliance, a wireless device, a user equipment (UE), or a data communication device, as examples.

Where mobile device 1000 is enabled for two-way communication, it may incorporate a communication subsystem 1011, including both a receiver 1012 and a transmitter 1014, as well as associated components such as one or more antenna elements 1016 and 1018, local oscillators (LOs) 1013, and a processing module such as a digital signal processor (DSP) 1020. Although not shown, communication subsystem 1011 may include additional components. For example, mobile device 1000 may comprise multiple receivers 1012 and/or transmitters 1014 to allow for simultaneous radio activity. In addition, as will be apparent to those skilled in the field of communications, the particular design of the communication subsystem 1011 will be dependent upon the communication network in which the device is intended to operate.

Network access requirements will also vary depending upon the type of network 1019. In some networks network access is associated with a subscriber or user of mobile device 1000. A mobile device may require one or more smart cards which can contain different applications such as a USIM, RUIM or a SIM application in order to operate on a network. The smart card interface 1044 is normally similar to a card-slot into which a smart card can be inserted and ejected. The smart card can have memory and hold many key configurations 1051, and other information 1053 such as identification, and subscriber related information.

Figure 10:
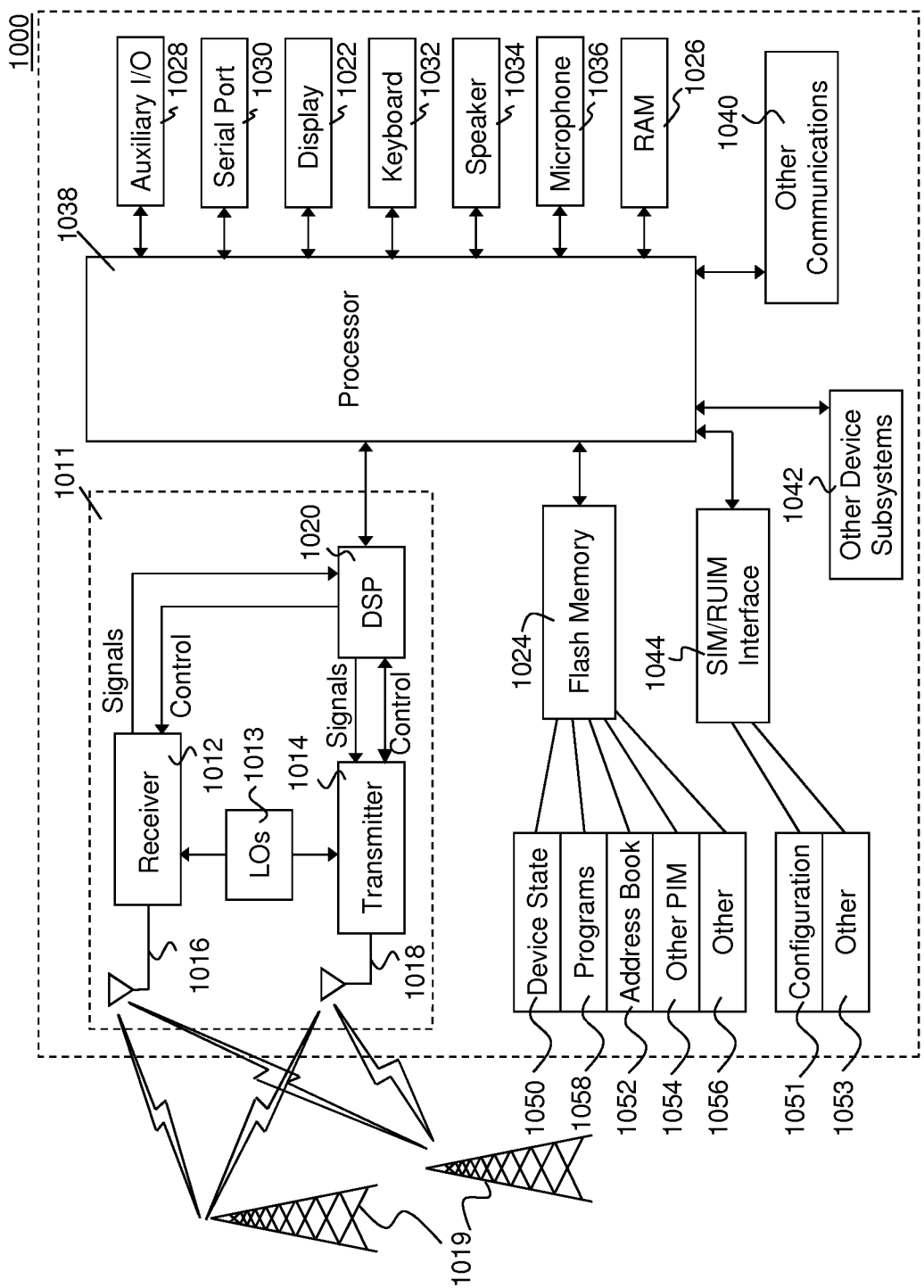
FIG. 10 is a block diagram of an example mobile device capable of being used in accordance with the embodiments herein.

When required network registration or activation procedures have been completed, mobile device 1000 may send and receive communication signals over the network 1019. As illustrated in FIG. 10, network 1019 can consist of multiple base stations communicating with the mobile device.

Signals received by antenna 1016 through communication network 1019 are input to receiver 1012, which may perform such common receiver functions as signal amplification, frequency down conversion, filtering, channel selection and the like. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the mobile device. A predetermined set of applications that control basic operations, including at least data and voice communication applications for example, will normally be installed on mobile device 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1019. Further applications may also be loaded onto the mobile device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the mobile device 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of mobile device 1000 may also compose data items such as email messages for example, using the keyboard 1032, which may be a complete alphanumeric keyboard or telephone-type keypad, whether virtual or real, among others, in conjunction with the display 1022 and possibly an auxiliary I/O device 1028. Such composed items may then be transmitted over a communication network through the communication subsystem 1011.

For voice communications, overall operation of mobile device 1000 is similar, except that received signals would typically be output to a speaker 1034 and signals for transmission would be generated by a microphone 1036. Alternative voice or audio I/O subsystems, such as a voice message recording subsystem, may also be implemented on mobile device 1000. Although voice or audio signal output is generally accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type mobile device for which synchronization with a user's desktop computer (not shown) may be desirable, but is an optional device component. Such a port 1030 would enable a user to set preferences through an external device or software application and would extend the capabilities of mobile device 1000 by providing for information or software downloads to mobile device 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the mobile device to a computer to act as a modem.

Other communications subsystems 1040, such as a short-range communications subsystem, is a further optional component which may provide for communication between mobile device 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WiFi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for administering multiple management agents on a mobile device comprising two or more domains, the method comprising:
receiving, at a policy manager on the mobile device, a policy from each of the multiple management agents on the mobile device, the policies controlling at least one of: access to shared services on the mobile device; security on the mobile device; or permissions for functionality of the mobile device;
establishing, by the policy manager, a hierarchy of trust designating, for each management agent, a respective level of trust of the management agent, the respective level of trust of the management agent being a function of a vendor that provided the management agent, wherein the is known to the policy manager and is associated with a level of trust;
determining which one or more of the domains are currently active;
consolidating, by the policy manager on the device, the policies based on rules within the policy manager and as a function of which one or more of the domains are currently active and the hierarchy of trust, thereby generating a consolidated policy; and
applying the consolidated policy on the mobile device, thereby controlling at least one of: access to shared services on the mobile device; security on the mobile device; or permissions for functionality of the mobile device;
wherein each of the management agents is an entity on the mobile device which receives policies from a corresponding external management authority.

2. The method of claim 1, wherein the consolidating comprises creating an aggregate restriction set based on restriction sets in the policies of each of the multiple management agents.

3. The method of claim 2, wherein the aggregated restriction set controls the access to shared services on the mobile device, the security on the mobile device, and the permissions for functionality of the mobile device.

4. The method of claim 2, further comprising updating the aggregated restriction set responsive to one of the two or more domains becoming active.

5. The method of claim 4, wherein the consolidating the policies is further based on at least one of: time of day, location of the mobile device, the network serving the mobile device, or regulation changes for the mobile device.

6. The method of claim 1, wherein consolidating the policies allows a management agent full control of a domain it is associated with, but limited control of the shared services or functionality outside of the domain the management agent is associated with.

7. The method of claim 1, wherein a policy for a management agent applies both to a domain associated with the management agent, as well as to other domains.

8. The method of claim 1, further comprising updating the consolidated policy upon addition of a new management agent.

9. A mobile device having a plurality of domains, the domains comprising concurrently operative operating systems, the mobile device comprising:
a processor; and
memory,
wherein the mobile device is configured to:
receive, at a policy manager on the mobile device, a policy from each of multiple management agents on the mobile device, the policies controlling at least one of: access to shared services on the mobile device; security on the mobile device; or permissions for functionality of the mobile device;
establish, by the policy manager, a hierarchy of trust designating, for each management agent, a respective level of trust of the management agent, the respective level of trust of the management agent being a function of a vendor that provided the management agent, wherein the vendor is known to the policy manager and is associated with a level of trust;
determine which one or more of the domains are currently active;
consolidate, by the policy manager, the policies based on rules within the policy manager and as a function of which one or more of the domains are currently active and the hierarchy of trust, thereby generating a consolidated policy; and
apply the consolidated policy on the mobile device;
wherein each of the management agents is an entity on the mobile device which receives policies from a corresponding external management authority.

10. The mobile device of claim 9, wherein the mobile device is configured to consolidate by creating an aggregate restriction set based on restriction sets in the policies of each of the multiple management agents.

11. The mobile device of claim 10, wherein the aggregated restriction set controls the access to shared services on the mobile device, the security on the mobile device, and the permissions for functionality of the mobile device.

12. The mobile device of claim 10, wherein the mobile device is further configured to update the aggregated restriction set responsive to one of the two or more domains becoming active.

13. The mobile device of claim 12, wherein the consolidating the policies is further based on at least one of: time of day, location of the mobile device, the network serving the mobile device, or regulation changes for the mobile device.

14. The mobile device of claim 9, wherein consolidating the policies allows a management agent full control of a domain it is associated with, but limited control of the shared services or functionality outside of the domain the management agent is associated with.

15. The mobile device of claim 9, wherein a policy for a management agent applies both to a domain associated with the management agent, as well as to other domains.

16. The mobile device of claim 9, wherein the mobile device is further configured to update the consolidated policy upon addition of a new management agent.

17. A non-transitory computer readable medium having processor executable instructions stored thereon that, when executed by a processor of a mobile device having a plurality of domains, the domains comprising concurrently operative operating systems, cause the mobile device to:
receive, at a policy manager on the mobile device, a policy from each of multiple management agents on the mobile device, the policies controlling at least one of: access to shared services on the mobile device; security on the mobile device; or permissions for functionality of the mobile device;
establish, by the policy manager, a hierarchy of trust designating, for each management agent, a respective level of trust of the management agent, the respective level of trust of the management agent being a function of a vendor that provided the management agent, wherein the vendor is known to the policy manager and is associated with a level of trust;
determine which one or more of the domains are currently active;
consolidate, by the policy manager, the policies based on rules within the policy manager and as a function of which one or more of the domains are currently active and the hierarchy of trust, thereby generating a consolidated policy; and
apply the consolidated policy on the mobile device;
wherein each of the management agents is an entity on the mobile device which receives policies from a corresponding external management authority.

18. The method of claim 1, Wherein consolidating the policies as a function of the hierarchy of trust comprises:
detecting a conflict between the policies of first and second management agents of the multiple management agents, the level of trust of the first management agent being higher than the level of trust of the second management agent; and
as a result of detecting the conflict, removing the policies of the second management agent.

19. The mobile device of claim 9, wherein consolidating policies as a function of the hierarchy of trust comprises:
detecting a conflict between the policies of first and second management agents of the multiple management agents, the level of trust of the first management agent being higher than the level of trust of the second management agent; and
as a result of detecting the conflict, removing the policies of the second management agent.

20. The non-transitory computer readable medium of claim 17, wherein consolidating the policies as a function of the hierarchy of trust comprises:
detecting a conflict between the policies of first and second management agents of the multiple management agents, the level of trust of the first management agent being higher than the level of trust of the second management agent; and
as a result of detecting the conflict, removing the policies of the second management agent.

* * * * *